United States Patent
Khromov et al.

(10) Patent No.: US 9,618,643 B2
(45) Date of Patent: Apr. 11, 2017

(54) METHOD AND APPARATUS FOR DECODING A SIGNAL SENT FROM A MEASUREMENT-WHILE-DRILLING TOOL

(75) Inventors: Sergey Khromov, Calgary (CA); Aaron Eddy, Calgary (CA); Robert Rodda, Calgary (CA)

(73) Assignee: PASON SYSTEMS CORP., Calgary (CA)

( * ) Notice: Subject to any disclaimer, the term of this patent is extended or adjusted under 35 U.S.C. 154(b) by 1040 days.

(21) Appl. No.: 12/984,255

(22) Filed: Jan. 4, 2011

(65) Prior Publication Data

US 2011/0187555 A1     Aug. 4, 2011

Related U.S. Application Data (60) Provisional application No. 61/292,120, filed on Jan. 4, 2010.

(51) Int. Cl.
*G01V 3/00* (2006.01)
*G01V 11/00* (2006.01)
*H04L 29/06* (2006.01)
*G01V 1/22* (2006.01)
*E21B 44/00* (2006.01)
*E21B 47/12* (2012.01)

(52) U.S. Cl.
CPC ............ *G01V 3/00* (2013.01); *G01V 11/002* (2013.01); *E21B 44/00* (2013.01); *E21B 47/12* (2013.01); *G01V 1/22* (2013.01); *H04L 29/06* (2013.01)

(58) Field of Classification Search
CPC ....... E21B 44/00; E21B 47/12; G01V 11/002; G01V 11/22; H04L 29/06; H04L 67/025; H04L 67/12; H04L 69/08

USPC ........................................ 340/853.2; 166/297
See application file for complete search history.

(56) References Cited

U.S. PATENT DOCUMENTS

| | | | | |
|---|---|---|---|---|
| 5,055,837 A | * | 10/1991 | Abdallah et al. | 367/83 |
| 5,331,318 A | * | 7/1994 | Montgomery | 340/855.4 |
| 6,577,229 B1 | * | 6/2003 | Bonneau et al. | 340/10.41 |
| 6,587,942 B1 | * | 7/2003 | Chiang | H03M 9/00 |
| | | | | 710/11 |

(Continued)

OTHER PUBLICATIONS

Office Action for Canadian Patent Application No. 2,689,756, with a mailing date of Nov. 2, 2015.

*Primary Examiner* — Amine Benlagsir
*Assistant Examiner* — Adnan Aziz
(74) *Attorney, Agent, or Firm* — Katten Muchin Rosenman LLP (57) ABSTRACT

Disclosed are a method and an apparatus for decoding a signal sent from a measurement-while-drilling tool. In order to decode the signal, a decoder implementation that is communicative according to a decoder implementation protocol and that is configured to decode the signal into a decoded signal is instantiated. The decoder implementation protocol is then conformed to a transmission protocol. The signal is sent to the decoder implementation according to the transmission protocol. Because the decoder implementation protocol has been conformed to the transmission protocol, the decoder implementation can receive the signal and can decode it. One way in which the decoder implementation protocol can be conformed to the transmission protocol is through the use of a translation layer between the module that sends the signal to be decoded and the decoder implementation.

35 Claims, 4 Drawing Sheets

(56) References Cited

U.S. PATENT DOCUMENTS

| | | | | |
|---|---|---|---|---|
| 6,829,663 B1* | 12/2004 | Ghaffari | ............... | G06F 13/385 |
| | | | | 710/65 |
| 7,477,161 B2* | 1/2009 | Macpherson | ......... | E21B 47/122 |
| | | | | 324/338 |
| 7,999,695 B2* | 8/2011 | Rodney et al. | ............ | 340/855.5 |
| 8,645,571 B2* | 2/2014 | Downton et al. | ............ | 709/246 |
| 8,789,180 B1* | 7/2014 | Yang | ................... | G06F 21/554 |
| | | | | 726/22 |
| 2002/0018487 A1* | 2/2002 | Chen | ........................ | G06F 9/54 |
| | | | | 370/465 |
| 2002/0133581 A1* | 9/2002 | Schwartz | ............ | H04L 12/2803 |
| | | | | 709/223 |
| 2004/0172657 A1* | 9/2004 | Phillips | ................ | G08B 27/005 |
| | | | | 725/110 |
| 2004/0262008 A1* | 12/2004 | Deans | ................ | E21B 41/0007 |
| | | | | 166/339 |
| 2005/0144645 A1* | 6/2005 | Casey | .................. | G08B 27/005 |
| | | | | 725/95 |
| 2006/0196664 A1* | 9/2006 | Hall et al. | ..................... | 166/297 |
| 2007/0188344 A1* | 8/2007 | Hache | ................ | E21B 47/12 |
| | | | | 340/853.1 |
| 2007/0276952 A1* | 11/2007 | Mitchell | ................ | H04L 69/03 |
| | | | | 709/230 |
| 2008/0240105 A1* | 10/2008 | Abdallah | ................ | H04L 12/66 |
| | | | | 370/392 |
| 2008/0316048 A1* | 12/2008 | Abdallah | ............. | G01V 11/002 |
| | | | | 340/854.6 |
| 2009/0045973 A1* | 2/2009 | Rodney et al. | ............ | 340/853.2 |
| 2009/0234971 A1* | 9/2009 | Jethanandani et al. | ....... | 709/246 |
| 2010/0194584 A1* | 8/2010 | Savage | ................ | G01V 11/002 |
| | | | | 340/853.1 |
| 2011/0069719 A1* | 3/2011 | Fries, IV | ............ | H04L 12/2836 |
| | | | | 370/463 |

\* cited by examiner

METHOD AND APPARATUS FOR DECODING A SIGNAL SENT FROM A MEASUREMENT-WHILE-DRILLING TOOL

CROSS REFERENCE TO RELATED APPLICATION

Pursuant to 35 U.S.C. §119(e), this application claims the benefit of provisional U.S. Patent Application No. 61/292,120, filed Jan. 4, 2009 and entitled "Method and Apparatus for Decoding a Signal Sent from a Measurement-While-Drilling Tool," which is hereby incorporated by reference in its entirety.

TECHNICAL FIELD

The present disclosure is directed at a method and apparatus for decoding a signal sent from a measurement-while-drilling tool. More particularly, the present disclosure is directed at a method and apparatus for facilitating use of multiple decoding units to decode differently encoded signals.

BACKGROUND

When drilling for oil or gas, accurately and precisely tracking the position of the borehole can be vitally important. For example, a directional driller may need to orient the borehole such that it either avoids or intersects one or more existing boreholes. Knowing the position of the borehole also allows the borehole to be drilled at an angle such that oil recovery from a reservoir can be increased by ensuring that the area of intersection between the borehole and the reservoir is relatively high. Furthermore, knowing the position of the borehole may be important to ensure that drilling does not occur in a prohibited area, such as an area in which only a competitor has rights to drill. Even when the borehole is intended to extend vertically, tracking the position of the borehole can be important to ensure that the borehole is, in fact, being drilled vertically.

To track borehole position, a measurement-while-drilling ("MWD") tool can be used. A MWD tool contains measurement instruments that are located within a drill string and typically near a drill bit. The MWD tool typically measures a variety of parameters relevant in directional drilling, such as:
  drill string inclination;
  drill string azimuth;
  toolface;
  gamma rays;
  resistivity of surrounding rock; and
  various diagnostic information (temperature, battery status, dip angle, total magnetic field strength, and total gravitational strength).

The MWD tool communicates measured parameters by sending a signal to the surface using any one of a variety of known transmission techniques, such as mud pulse telemetry, electromagnetic telemetry, and wired pipe. The transmitted information is then used by any one or more of the directional driller, a geologist, and a MWD technician to drill the borehole according to a predetermined trajectory.

The signal the MWD tool transmits can be encoded according to a cipher that is proprietary to the MWD tool manufacturer. Consequently, in order to decode the signal, a decoder that the MWD tool manufacturer provides is required. In other words, a one-to-one dependence typically exists between the MWD tool and the decoder used to decode signals that the MWD tool transmits. This setup can be cumbersome when a user wants to use a single piece of hardware to decode signals sent from a variety of different MWD tools.

Accordingly, there exists a need for at least one of a method and apparatus for decoding a signal sent from a MWD tool that improves on the prior art.

SUMMARY

According to one aspect, there is provided a method for decoding a signal sent from a measurement-while-drilling tool. The method includes instantiating a decoder implementation configured to decode the signal into a decoded signal and communicative according to a decoder implementation protocol; conforming the decoder implementation protocol to a transmission protocol used to send the signal such that the decoder implementation can receive the signal, wherein the decoder implementation is unable to receive (and therefore unable to decode) the signal prior to the decoder implementation protocol being conformed; sending the signal according to the transmission protocol to the decoder implementation; and decoding the signal into the decoded signal using the decoder implementation.

The method may also include, following decoding, sending the decoded signal to a signal processing unit, communicative according to a signal processing unit protocol, for processing.

The transmission protocol may be the signal processing unit protocol and the signal processing unit may send the signal to the decoder implementation for decoding.

Sending the signal according to the transmission protocol may include sending the signal on a per sample basis. Sending the signal according to the transmission protocol may also include sending a sampling rate at which the signal was sampled to the decoder implementation to facilitate decoding.

The decoded signal may include parameters measured by the measurement-while-drilling tool. Sending the decoded signal to the signal processing unit may be done by asynchronously sending the parameters from the decoder implementation to the signal processing unit. Listener modules may be instantiated to asynchronously send the parameters.

Asynchronously sent parameters may be selected from a group consisting of a type of a measurement-while-drilling word, a value of the measurement-while-drilling word, a checksum of the measurement-while-drilling word, quality of the measurement-while-drilling word, a time at which the measurement-while-drilling word was decoded, a type of error encountered when decoding the measurement-while-drilling word, a percentage of expected measurement-while-drilling words that have been successfully decoded, a quality rating of the signal, status of the decoder implementation, height of pressure pulses detected by the decoder implementation, a current mode in which the measurement-while-drilling tool is configured to operate, mud pump state, whether a change in measurement-while-drilling tool mode has occurred, and a new mode in which the measurement-while-drilling tool is to operate.

Parameters may also be synchronously sent by sending a synchronous request from the signal processing unit to the decoder implementation requesting at least one of the parameters, and by then synchronously responding to the synchronous request. Synchronously sent parameters may be selected from a group consisting of current status of the decoder implementation, current pulse height, current mud pump state, current quality rating of the signal, percentage of expected words from the measurement-while-drilling tool that have been successfully decoded, and current mode in which the measurement-while-drilling tool is configured to operate.

The method may also include sending to the decoder implementation information regarding a tool mode in which the measurement-while-drilling tool was operating when sampling the signal.

The decoded signal may include data that the signal processing unit can use to display mud pulses sent by the measurement-while-drilling tool.

Instantiating the decoder implementation may be performed by accessing a decoder definition list file containing a listing of decoder definition files corresponding to first and second decoder implementations, wherein the first and second decoder implementations are configured to decode differently encoded signals; and instantiating the decoder implementation corresponding to the encoding of the signal. A user may provide input via, for example, a graphical user interface, indicating which of the decoder implementations he or she wants to use to decode the signal. The selected decoder implementation may then be used to decode the signal.

According to another aspect, there is provided an apparatus for decoding a signal sent from a measurement-while-drilling tool. The apparatus includes a processor and a computer readable medium communicatively coupled to the processor. The computer readable medium has encoded thereon statements and instructions to cause the processor to perform any or the foregoing methods or particular variants, aspects, or embodiments thereof.

According to another aspect, there is provided a computer readable medium having encoded thereon statements and instructions to cause a processor to perform a method for decoding a signal sent from a measurement-while-drilling tool. The computer readable medium has encoded thereon statements and instructions to cause the processor to perform any or the foregoing methods or particular variants, aspects, or embodiments thereof.

According to another aspect, there is provided an apparatus for decoding a signal sent from a measurement-while-drilling tool. The apparatus includes a signal processing unit communicatively coupled to the measurement-while-drilling tool and having a downstream interface configured to communicate according to a signal processing unit protocol, wherein the downstream interface is for sending the signal for decoding and for receiving a decoded signal; and a decoding unit. The decoding unit includes a decoder implementation configured to decode the signal into the decoded signal; the decoder implementation also has an upstream interface configured to communicate according to a decoder implementation protocol that differs from the signal processing unit protocol, wherein the upstream interface is for receiving the signal for decoding and for sending the decoded signal. The decoding unit also includes a translation layer communicatively coupled between the downstream interface of the signal processing unit and the upstream interface of the decoding unit, which is configured to translate the signal processing unit protocol to the decoder implementation protocol such that the signal processing unit and the decoding unit are communicatively coupled.

BRIEF DESCRIPTION OF THE DRAWINGS

In the accompanying drawings, which illustrate one or more exemplary embodiments.

DETAILED DESCRIPTION OF EXEMPLARY EMBODIMENTS

Figure 1:
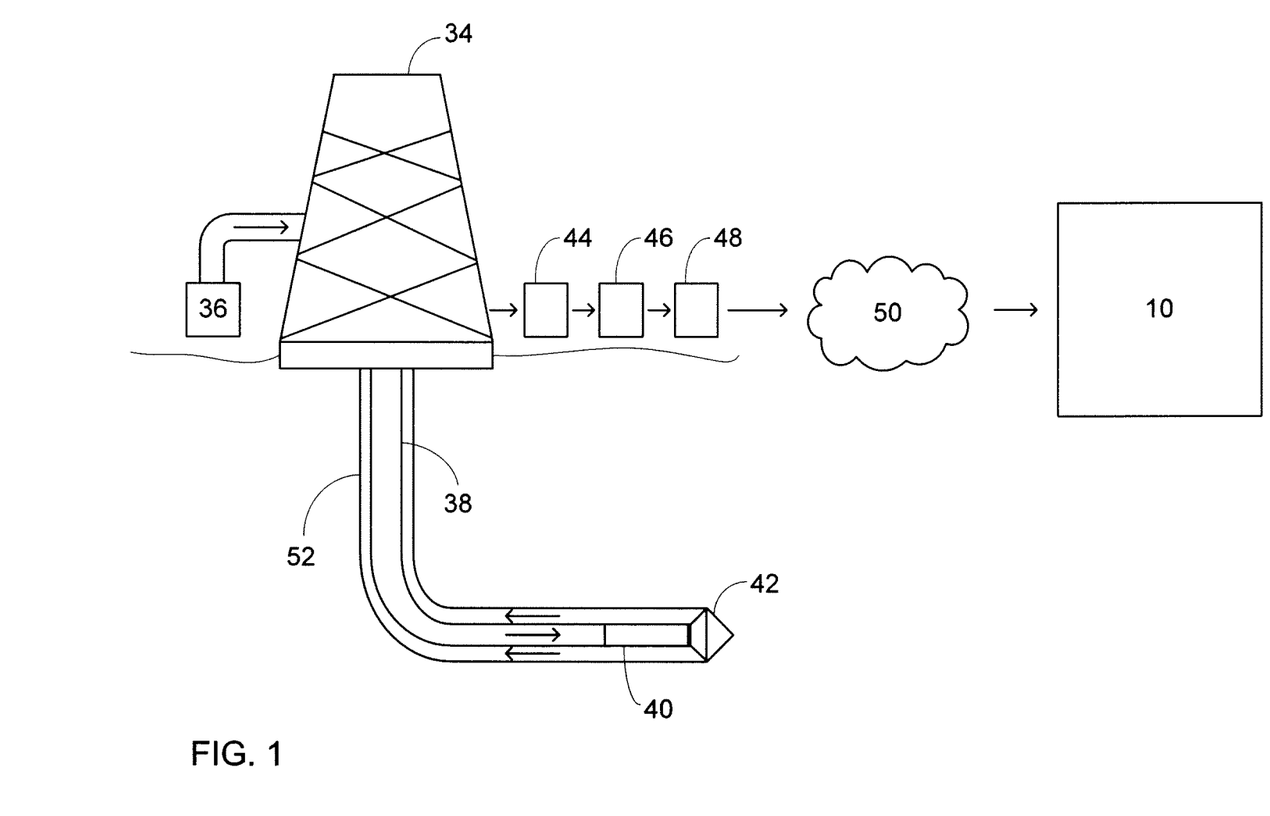
FIG. 1 is a schematic view of a MWD tool being used to acquire a signal that is transmitted to an apparatus for decoding the signal, according to a first embodiment.

A MWD tool is commonly used to acquire data that is relevant in directional drilling. Referring now to FIG. 1, there is depicted a drilling rig 34 that is being used in directional drilling. Extending below the drilling rig 34 is a drill string 38 having a drill bit 42 at one end that is used to drill a borehole 52. The drill string 38 includes bent sections such that the borehole 52 that is drilled is non-vertical. Located near the drill bit 42 is the MWD tool 40. The MWD tool 40 is used to measure a variety of parameters that are relevant in directional drilling, such as drill string inclination, drill string azimuth, toolface, gamma ray intensity, the resistivity of the surrounding rock, and various other pieces of diagnostic information. The MWD tool 40 then transmits the measured parameters back to the surface.

In FIG. 1, the MWD tool 40 uses mud pulses to transmit the measured parameters to the surface. On the surface is a pump 36 that pumps drilling fluid ("mud") down through the interior of the drill string 38. At the drill bit 42, the mud exits the drill string and returns to the surface through the annular cavity between the drill string 38 and the interior surface of the borehole 52. The flow of the mud from the pump 36, through the drill string 38 and back to the surface is indicated by the arrows that extend along the mud flow path. The flow of the mud through the MWD tool 40 is intermittently restricted by a mud pulser within the MWD tool 40 that creates pressure pulses in the mud flow input into the drill string 38 from the pump 36 ("input mud flow"). Communicating the signal using pressure pulses in the input mud flow is referred to as "mud pulse telemetry". While the present embodiment is utilized in conjunction with mud pulse telemetry, in alternative embodiments other suitable forms of telemetry can be used. For example, electromagnetic telemetry and wired pipe can be used to communicate the signal.

The pressure pulses constitute a signal that represents the measured parameters that are measured by the MWD tool 40 and are encoded according to a cipher that is proprietary to the manufacturer of the MWD tool 40. The pressure pulses are transmitted up to the surface through the mud and are measured by a pressure sensor 44 that senses pressure changes in the input mud flow. The output of the pressure sensor 44 is a 4 mA to 20 mA electrical analog signal that is transmitted to and digitized by an analog-to-digital converter ("ADC") 46. The ADC 46 digitizes the analog signal at a rate of 50 Hz. The pressure sensor 44 and the ADC 46 form part of a system that is used to automatically record measured parameters sent by the MWD tool 40; an example of such a system is the Pason™ Electronic Drilling Recorder. The digital signal that the ADC 46 outputs is then sent to a doghouse computer 48 over a RS422 connection.

The doghouse computer 48 transmits the digital signal over a network 50 to an apparatus 10 for decoding the signal. The network 50 may be, for example, a packet-switched wide or local area network communicative using TCP/IP.

Figure 2:
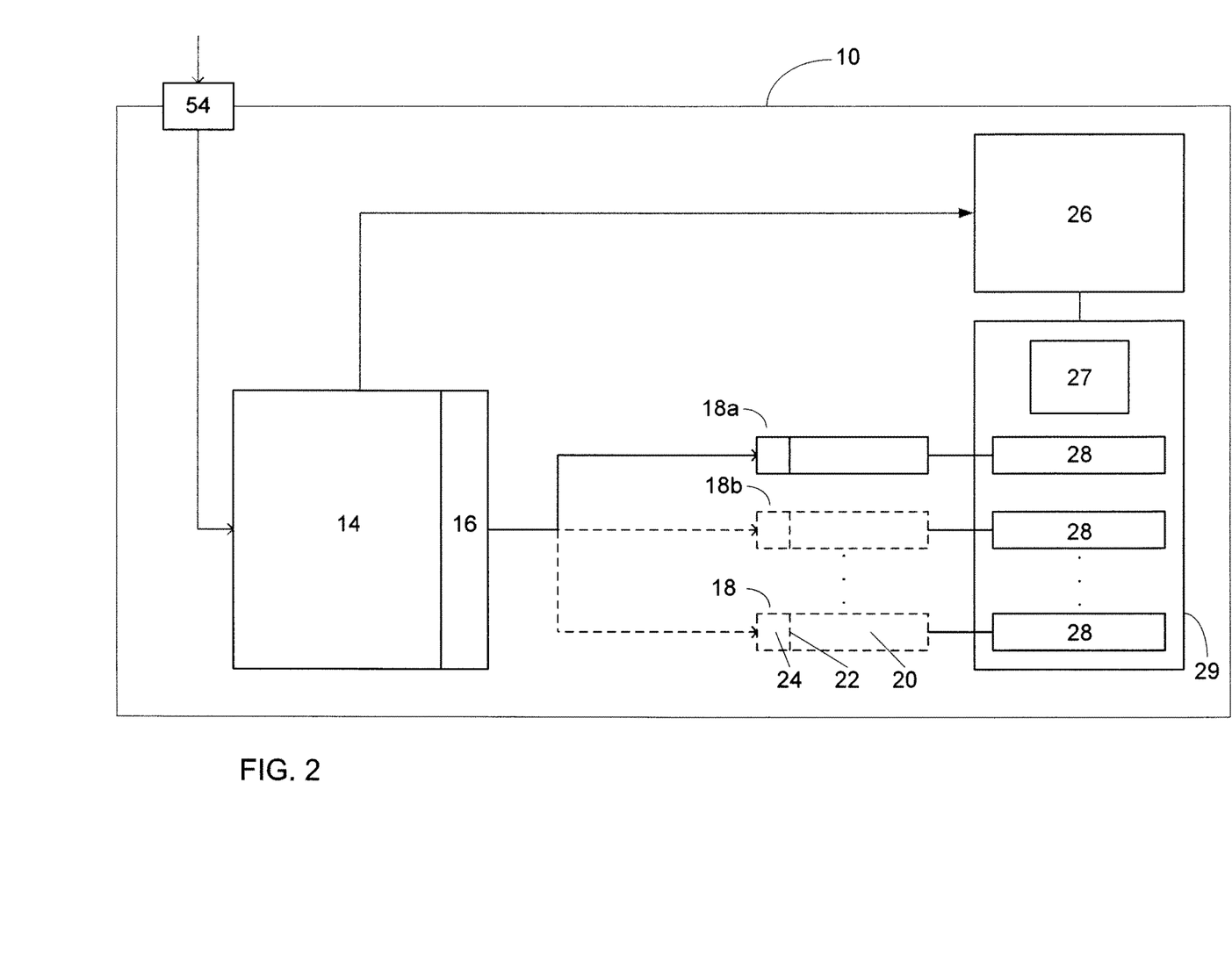
FIG. 2 is a block diagram of the apparatus for decoding the signal sent from the MWD tool, according to the first embodiment.

Referring now to FIG. 2, there is depicted a block diagram of the apparatus 10 that is used to decode the signal. The signal enters the apparatus 10 through a communications port 54, which is any port suitable to receive the signal sent from the doghouse computer 48. When the signal is sent from the doghouse computer 48 using TCP/IP, the communications port 54 may be an Ethernet port. Communicatively coupled to the communications port 54 is a signal processing unit 14 that receives the signal. Once the signal is decoded, the signal processing unit 14 is configured to use the measured parameters that are contained in the signal. For example, the signal processing unit 14 may include a graphical user interface that displays measured parameters such as drill string inclination, drill string azimuth, and toolface to a directional driller such that the directional driller can ensure drilling proceeds according to a drilling plan.

The signal processing unit 14 includes a downstream interface 16 that is used to send the signal to a decoding unit 18 for decoding. The downstream interface 16 sends the signal according to a signal processing unit protocol, which includes method calls to an Application Programming Interface ("API"), as discussed in greater detail below.

Each of the decoding units 18 includes a decoder implementation 20 that is used to decode the signal into a decoded signal. The decoder implementation 20 is typically supplied by the manufacturer of the MWD tool 40 and is consequently able to decode the signal sent by the MWD tool 40 that is encoded using the proprietary cipher. One example of the decoder implementation 20 is the GE™ Tensor Tolteq decoder implementation available from Tolteq. Each of the decoder implementations 20 has an upstream interface 22 that is used to receive the signal for decoding and to send the decoded signal. Just as each of the different decoder implementations 20 is able to decode a differently encoded signal, the upstream interfaces 22 of each of the decoder implementations 20 each communicate according to its own decoder implementation protocol. The decoder implementation protocol is not the same as the signal processing unit protocol. Consequently, the decoder implementations 20 and the signal processing unit 14 are not able to directly communicate.

In order to enable communication between the signal processing unit 14 and the decoder implementations 20, the upstream interface 22 of each of the decoder implementations 20 communicates with the downstream interface 16 of the signal processing unit 14 through a translation layer 24. Each of the decoding units 18 has one translation layer 24 configured specifically to facilitate communication with the decoder implementation 20 of that decoding unit 18. For each of the decoding units 18, the translation layer 24 conforms the decoder implementation protocol used by the upstream interface 22 of the decoder implementation 20 to the signal processing unit protocol used by the downstream interface 16 of the signal processing unit 14. In the present embodiment, when the signal processing unit protocol is an API, the translation layer 24 interfaces with the decoder implementation 20 according to the decoder implementation protocol and interfaces with the signal processing unit 14 according to the API.

Figure 3:
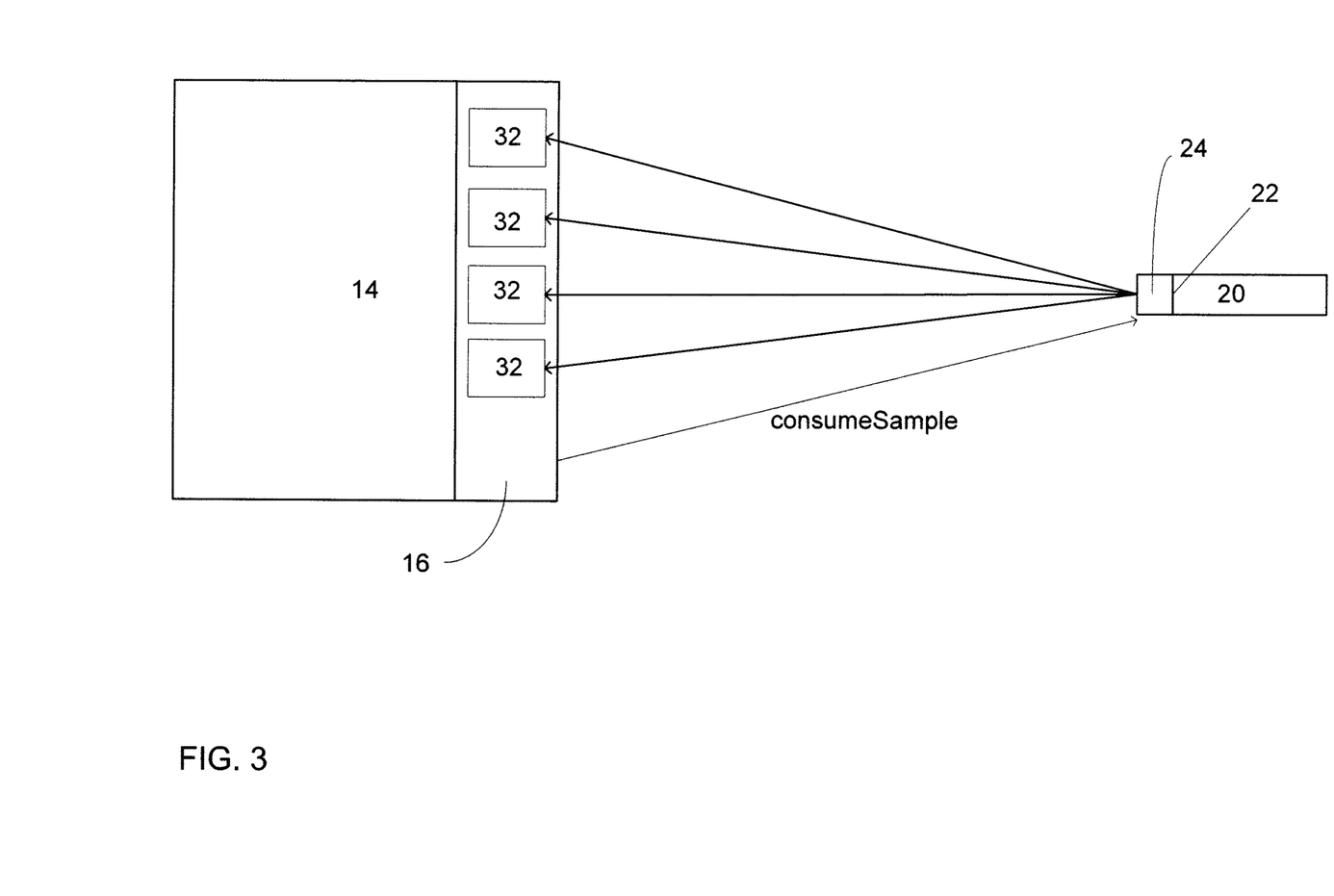
FIG. 3 is a block diagram illustrating modules that facilitate communication between a signal processing unit and a decoder implementation that form part of the apparatus for decoding the signal, according to the first embodiment.

The API includes different methods that the signal processing unit 14 calls in order to decode the signal, as follows (the "*" indicates a wildcard):

add*Listener: the add*Listener family of methods is used to add listener modules 32 (illustrated in FIG. 3) to the decoder implementation 20. Each of the listener modules 32 accepts as an input one of the decoded measured parameters from the decoder implementation 20 and asynchronously outputs the decoded measured parameter to the signal processing unit 14.

remove*Listener: the remove*Listener family of methods is used to remove the listener modules 32 from the decoder implementation 20. When one of the listener modules 32 is removed, the signal processing unit 14 no longer receives the decoded measured parameter associated with the removed listener module 32.

get*: the get* family of methods is used to request that the decoder implementation 20 send a specific one of the decoded measured parameters to the signal processing unit 14. Notably, when the get* family of methods is called, the decoded measured parameters are not sent asynchronously via one of the listener modules 32. Instead, the get* family of methods are each called synchronously, which means that the signal processing unit 14 waits until it receives a response from any called method prior to proceeding to its next task.

set*Consumer: the set*Consumer family of methods is used to obtain information used to generate different graphical views of the pressure pulses that the MWD tool 40 transmits.

consumeSample: the consumeSample method is called each time the signal processing unit 14 sends a sample of the signal to the decoding unit 18 for decoding. Analogous to how each of the listener modules 32 is used to transmit decoded measured parameters from the decoder implementation 20 to the signal processing unit 14, the consumeSample method is used to transmit a sample of the signal from the MWD tool 40 to the decoder implementation 20 for decoding. As mentioned above, in the present embodiment the ADC 46 samples the signal from the MWD tool 40 at a rate of 50 Hz.

sampleRateChanged: the sampleRateChanged method is called to instruct the decoder implementation 20 as to the sampling rate at which the ADC 46 digitizes the signal from the MWD tool 40. The decoder implementation 20 uses the sampling rate to determine how calls to the consumeSample method relate to real time. For example, if consumeSample is called at a frequency of 100 Hz but the sampling rate of the signal is known to be 50 Hz, the decoder implementation 20 knows that samples of the signal are being sent to it at twice the real time rate, and can decode the signal accordingly. Notably, as decoding is a processor intensive task but not a time critical task, the signal does not have to be decoded in real time; consequently, the rate at which the signal is sent to the decoder implementation 20 does not have to equal the rate at which the ADC 46 samples the signal.

start and stop: the start method is sent to the decoder implementation 20 to commence signal decoding, while the stop method is sent to the decoder implementation 20 to cease signal decoding. When the start method is called, the decoder implementation 20 sends decoded measured parameters to the signal processing unit 14 via the listener modules 32. When the stop method is called, the decoder implementation ceases sending decoded measured parameters to the signal processing unit 14.

sourceReset: the sourceReset method is called to reset the decoder implementation 20 as required.

setToolMode: the setToolMode method is called to reconfigure the decoder implementation 20 according to a tool mode specified when setToolMode is called. As is known to skilled persons, certain MWD tools 40 are operable in different modes, as specified by the manufacturers of the MWD tools 40.

The methods that are included in the add*Listener, remove*Listener, get*, and set*Consumer family of methods are as follows:

Methods in the add*Listener family:

addMWDDataListener: the addMWDDataListener method adds one of the listener modules 32 used to receive decoded measured parameters in the form of MWD words from the decoder implementation 20 and to send the MWD words to the signal processing unit 14. The listener modules 32 added using the addMWDDataListener method are each hereinafter referred to as a "MWD data listener". Each MWD word has the following attributes:

Type of MWD word that the MWD data listener is configured to convey from the decoder implementation 20 to the signal processing unit 14: available word types include automatic toolface; azimuth; battery voltage of the MWD tool 40; a flag indicating whether the battery of the MWD tool 40 is low; a flag indicating whether the second battery in the MWD tool 40 is on; a word identifying the configuration of the MWD tool 40; dip angle; a flag indicating that the dip angle is outside accepted parameters; a conventional gamma radiation reading; a warning that the gravitational field is outside accepted parameters; gravity toolface; inclination; a warning that the magnetic field is outside accepted parameters; magnetic toolface; a flag indicating that a word is to be sent in several parts; a survey sequence number; a flag warning that the measured temperature is outside accepted parameters; temperature; toolface sequence number; total gravity; total magnetic field; and an unknown word. Other types of words are possible in alternative embodiments and may depend on the type of MWD tool 40 used.

Value: value of the MWD word as a floating point number.

Checksum: checksum of the MWD word.

Quality: quality of the MWD word as a percentage from 0 to 100.

Time: time at which the MWD word was decoded.

Type of error, if any, encountered when decoding the word: the attribute may indicate no error; an unknown error; that the duration of one of the pressure pulses sent by the MWD tool 40 was outside the range of acceptable pulse durations to properly map the pressure pulse to a value; that no MWD pulses were detected in the signal; that a bad parity bit was detected; or that a bad error correction code was detected.

addPropertyChangeListener: the addPropertyChangeListener method adds one of the listener modules 32 used to monitor property states and to convey changes in property states to the signal processing unit 14. The listener module 32 added using the addPropertyChangeListener method is hereinafter referred to as a "property change listener". The property change listener sends the following information to the signal processing unit 14:

The percentage of expected words from the MWD tool 40 that have been successfully decoded.

The current quality rating of the signal as a percentage from 0 to 100.

The current status of the decoder implementation 20. Expressed as decoding being complete; decoding of message headers occurring; decoding survey information; decoding toolface information; synchronization not possible (so decoding is not occurring); the pump 36 is off so no decoding is being performed; synchronization is delayed; waiting for synchronization; and unknown.

The height of the pressure pulses detected by the decoder implementation 20.

The mode in which the MWD tool 40 is currently configured to operate.

addPumpStateListener: the addPumpStateListener method adds one of the listener modules 32 used to monitor pump state and to convey changes in pump state to the signal processing unit 14. The listener module 32 added using the addPumpStateListener method is hereinafter referred to as a "pump state listener". The pump state listener tells the signal processing unit 14 that the pumps are either on, off, or in an unknown state.

addToolModeChangeListener: the addToolModeChangeListener adds one of the listener modules 32 used to monitor changes in tool mode and to convey changes in tool mode to the signal processing unit 14. The listener module 32 added using the addToolModeChangeListener method is hereinafter referred to as a "tool mode listener". The tool mode listener tells the signal processing unit 14 when the tool mode of the MWD tool 40 has been changed, and also communicates the new tool mode.

Methods in the remove*Listener family:

removeMWDDataListener, removePropertyChangeListener, removePumpStateListener, remove ToolModeChangeListener. Each of these methods when called by the signal processing unit 14 terminate the various listener modules that are created with the add*Listener family of methods described above. For example, if the signal processing unit 14 were obtaining decoded MWD words via the MWD data listener and then called removeMWDDataListener, the signal processing unit 14 would cease to receive the decoded MWD words.

Methods in the get* family:

getDecodeStatus: sends the current status of the decoder implementation 20 from the decoding unit 18 to the signal processing unit 14.

getPulseHeight: sends the current pulse height of the decoder implementation 20 from the decoding unit 18 to the signal processing unit 14.

getPumpState: sends the current pump state from the decoding unit 18 to the signal processing unit 14.

get Quality: sends the current quality rating of the signal from the decoding unit 18 to the signal processing unit 14.

getSuccessPercent: sends the percentage of expected words from the MWD tool 40 that have been successfully decoded from the decoding unit 18 to the signal processing unit 14.

getToolMode: sends the current tool mode of the MWD tool 40 from the decoding unit 18 to the signal processing unit 14.

Methods in the set*Consumer family:

setPulseViewDownsampledConsumer: Sends to the signal processing unit 14 data that can be used to display pulses sent from the MWD tool 40 that are detected by the decoder implementation 20. Pulses represent the signal sent from the MWD tool 40 following all filtering and other signal conditioning steps.

setRawFilteredDownsampledConsumer: Sends to the signal processing unit 14 data that can be used to display pulses that have only partially been conditioned. This data is noisier than the pulses obtained using the setPulseViewDownsampledConsumer method.

Instantiating and Initializing One of the Decoding Units 18

Also depicted in FIG. 2 is a decoder configuration manager 26 that is used to instantiate the decoding units 18. The decoder configuration manager 26 is communicatively coupled to the signal processing unit 14 and has access to a file system 29 of the apparatus 10. Stored within the file system 29 are a decoder definition list file 27 and various decoder definition files 28 that are referred to within the decoder definition list file 27. An exemplary decoder definition list file 27 in XML format follows:

```
<?xml version="1.0" encoding="UTF-8"?>
<tools>
  <tool xml="conf/tool_modules/GETensorTolteq.xml"/>
  <tool xml="conf/tool_modules/PasonTensorDecoder.xml"/>
</tools>
```

The decoder definition list file 27 lists the decoder definition files 28 for the available decoder implementations 20. In this embodiment, two decoder implementations 20 are available: one GE™ Tensor Tolteq decoder implementation, and one Pason™ Tensor decoder implementation.

An exemplary decoder definition file 28 written in XML for the GE™ Tensor Tolteq decoder implementation 20 follows:

```
GETensorTolteq.xml:
<?xml version="1.0" encoding="UTF-8"?>
<tool>
  <id>GETensorToltepImpl</id>
  <description>GE Tensor compatible (Tolteq decoder)</description>
  <factory>com.pason.mwd.decoder.tolteqdecoder.-
  TolteqMWDDecoderFactory</factory>
  <defaultConfigurationFile>default.mwd</defaultConfigurationFile>
  <configurationFileType>MWD</configurationFileType>
  <parameters>
    <parameter name="prefsPath">conf/tolteq/</parameter>
  </parameters>
</tool>
```

An exemplary decoder definition file 28 written in XML for the Pason™ Tensor decoder implementation 20 follows:

```
PasonTensorDecoder.xml:
<?xml version="1.0" encoding="UTF-8"?>
<tool>
  <id>PasonTensorDecoder</id>
  <description>GE Tensor compatible</description>
  <factory>com.pason.mwd.decoder.tensor.TensorDecoderFactory
  </factory>
  <defaultConfigurationFile>default.mwd</defaultConfigurationFile>
  <configurationFileType>MWD</configurationFileType>
  <parameters>
  </parameters>
</tool>
```

Regardless of the specific decoder implementation 20 used, the decoder definitions files 28 utilize a layout as follows:

```
<?xml version="1.0" encoding="UTF-8"?>
<tool>
  <id>DecoderId</id>
  <description>Decoder description</description>
  <factory>Decoder Implementation Factory</factory>
  <defaultConfigurationFile> configuration file</defaultConfigurationFile>
  <configurationFileType>File type</configurationFileType>
  <parameters>
    <parameter name="namen">value</parameter>
  </parameters>
</tool>
```

The "id" field is an identifier for the decoder implementation 20 that is used internally by the signal processing unit 14. The "description" field is a human readable description of the decoder implementation 20; the description field is presented to the user when the user is selecting which of the decoder implementations 20 to use. When the Java programming language is used to instantiate the decoding unit 18, the "factory" field is the name of a fully qualified Java class of the factory used to instantiate the decoding unit 18. The "defaultConfigurationFile" field is the name and location of the default configuration file to be used by the decoder implementation 20; the configuration file is typically supplied by the manufacturer of the decoder implementation 20. The user may modify the configuration file if so desired. The "configurationFileType" field is the type of configuration file that is used to program the decoder implementation 20. The "parameters" field contains a list of parameters, if any, used by the decoder implementation 20.

In order to instantiate one of the decoder implementations 20, the decoder configuration manager 26 first accesses the decoder definition list file 27 and, in turn, each of the decoder definition files 28 to obtain the "description" field from each of the decoder definition files 28. The decoder configuration manager 26 sends the description fields to the signal processing unit 14, which displays them to the user in a drop-down list. The user is able to select which of the decoder implementations 20 is to be instantiated. This information is returned to the decoder configuration manager 26 via the signal processing unit 14. In the present embodiment, the GE™ Tensor Tolteq decoder implementation 20 is selected, which forms part of a first decoding unit 18a in FIG. 2.

Figure 4:
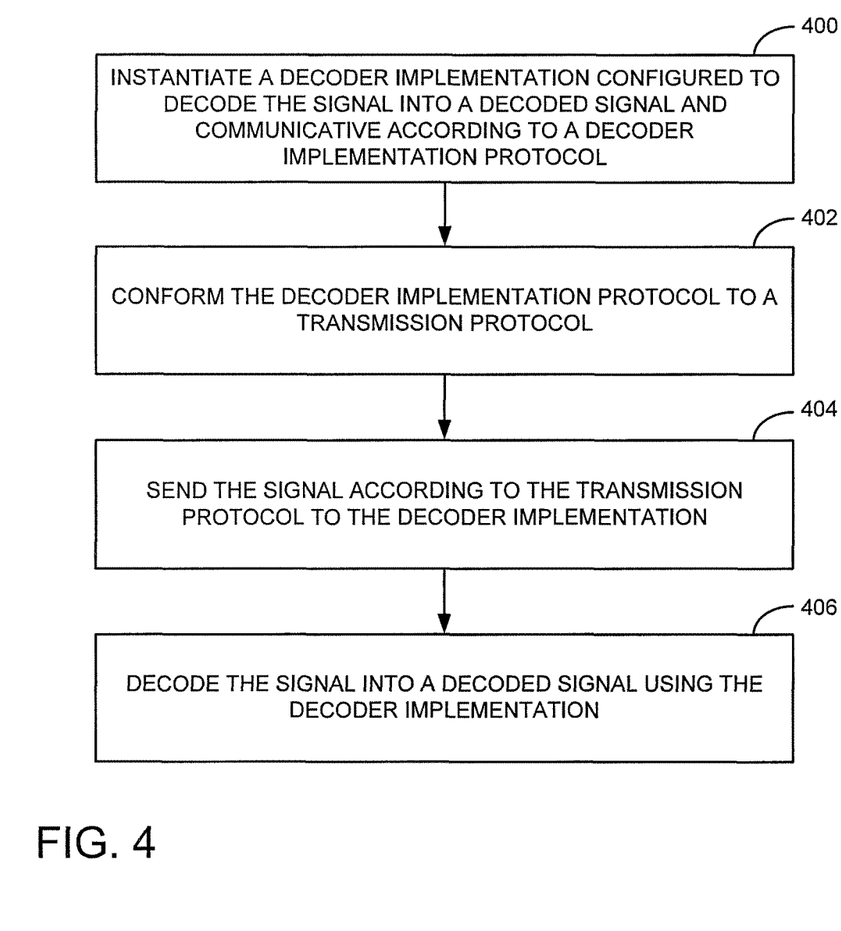
FIG. 4 is a flowchart describing how the signal sent from the MWD tool is decoded, according to a second embodiment.

The decoder configuration manager 26 then instantiates the first decoding unit 18a using the TensorDecoderFactory Java factory, as identified in the "factory" field in the decoder definition file 28 for the GE™ Tensor Tolteq decoder implementation 20. The decoder configuration manager 26 calls two methods included in the TensorDecoderFactory interface: setConfigurationInputStreamFactory, which sets the input stream factory to be used for communicating configuration information specific to the decoder implementation 20; and setParams, which sets parameters defined for the TensorDecoderFactory that are specific to the GE™ Tensor Tolteq decoder implementation 20, as specified in the decoder definition file 28 for the GE™ Tensor Tolteq decoder implementation 20. The decoder configuration manager 26 then calls the getDecoder method that also forms part of the interface of the TensorDecoderFactory; this creates the translation layer 24 that conforms the upstream interface 22 of the decoder implementation 20 to the downstream interface 16 of the signal processing unit 14. In other words, following execution of the getDecoder method, the translation layer 24 is created and the signal processing unit 14 can communicate with the decoder implementation 20 by calling the methods that are included in the API. Following the calling of getDecoder, the first decoding unit 18a is considered instantiated. Referring to FIG. 4, which depicts a method for decoding a signal sent from the MWD tool 40, following instantiation of the first decoding unit 18a the processes described in blocks 400 and 402 of FIG. 4 are complete. That is, instantiating the first decoding unit 18a involves instantiating the GE™ Tensor Tolteq decoder implementation 20, which is configured to decode the signal into a decoded signal and which is communicative according to a protocol that differs from the API that the signal processing unit 14 is configured to use (block 400). Instantiating the first decoding unit 18a also results in the translation layer 24, which conforms the native protocol of the GE™ Tensor Tolteq decoder implementation 20 to the API used by the signal processing unit 14 (block 402). Notably, block 402 in FIG. 4 refers to a "transmission protocol"; while the present embodiment contemplates the "transmission protocol" being the same as the signal processing unit protocol, in alternative embodiments the first decoding unit 18a may communicate with a module, other than the signal processing unit 14, that communicates according to the transmission protocol.

Following instantiation of the first decoding unit 18a, the GE™ Tensor Tolteq decoder implementation 20 is initialized. The signal processing unit 14 calls the sampleRateChanged method in the API to instruct the decoder implementation 20 that the sampling rate is 50 Hz; if the sampling rate of the ADC 46 changes, the sampleRateChanged method can be called again. The signal processing unit 14 then calls each method in the add*Listener family of methods to instantiate the listener modules 32: the MWD data listener, the property change listener, the pump state listener, and the tool mode change listener. More than one of each of these listener modules 32 can be instantiated if so desired. In the present embodiment in which the first decoding unit 18a sends the decoded signal only to the signal processing unit 14, only one of each of the listener modules 32 is instantiated. In alternative embodiments in which the decoder unit 18a sends the decoded signal to a variety of different destinations (e.g.: the signal processing unit 14 and a different device for recording the decoded signal, such as the Pason™ Electronic Data Recorder), another set of the listener modules 32 can be instantiated to asynchronously send the measured parameters to the different device. This is graphically depicted in FIG. 3, which illustrates the various listener modules 32 that that facilitate communication between the signal processing unit 14 and the decoder implementation 20. In the present embodiment, each of the listener modules 32 added using the methods in the add*Listener family of methods is instantiated as part of the signal processing unit 14. However, in alternative embodiments, the listener modules 32 can form part of the first decoder unit 18a or be distinct from the first decoder unit 18a and the signal processing unit 14. One of the two methods in the set*Consumer family of methods is also called to obtain a desired graphical view of the signal. The signal processing unit 14 then calls each of the methods in the get* family of methods to obtain the initial state from each of the listener modules 32. The start method is then called, and decoding of the signal can begin.

Decoding the Signal Sent from the MWD Tool 40 Using One of the Decoding Units 18

In order to decode the signal sent from the MWD tool 40 and following instantiation of the first decoding unit 18a, the signal processing unit 14 calls the consumeSample method and sends one sample of the signal to the first decoding unit 18a. Again referring to FIG. 4, this completes the process described in block 404. The first decoding unit 18a accepts the sample through the translation layer 24 and decodes it using the decoder implementation 20, as described in the process described in block 406 of FIG. 4. Multiple samples may have to be sent from the signal processing unit 14 to the first decoding unit 18a and decoded in order for a usable portion of the decoded signal to be generated. When the decoded signal is generated, the first decoding unit 18a sends it back to the signal processing unit 14 using one of the listener modules 32: if the decoded signal is a MWD word, it is sent via one of the MWD data listeners; if it contains pump state information, it is sent via one of the pump state listeners; if it contains property state information, it is sent via one of the property state listeners; and if it contains tool mode information, it is sent via one of the tool mode listeners. In this way, the encoded signal sent from the MWD tool 40 is decoded by the decoder implementation 20 and the decoded signal is returned to the signal processing unit 14 for, for example, display to the user.

Changing to a Different One of the Decoding Units 18

The stippled lines in which all of the decoding units 18 in FIG. 2 are depicted apart from the first decoding unit 18a indicate that although the signal processing unit 14 of the present embodiment sends the signal from the MWD tool 40 to only one of the decoding units 18 at any given time, multiple of the decoding units 18 can be instantiated and used with the signal processing unit 14.

Instantiating a second decoding unit 18b is done analogously to instantiating the first decoding unit 18a, the process for which is described above. As with instantiating the first decoding unit 18a, the user first selects one of the decoder implementations 20 enumerated in the decoder definition list file 27. The user may, for example, select the Pason™ Tensor decoder implementation 20. As described above in respect of the first decoding unit 18a and blocks 400 and 402 of FIG. 4, the second decoding unit 18b is instantiated and conformed to the signal processing unit 14 protocol. The second decoding unit 18b is also initialized as described above. The signal can then be sent from the signal processing unit 14 to the second decoding unit 18b instead of the first decoding unit 18a for decoding.

Any multiple decoding units 18 that are instantiated can either all be resident in memory simultaneously, or alternatively the apparatus 10 can be configured such that only one of the decoding units 18 is resident in memory at any given time.

Enabling the use of multiple of the decoding units 18 as described above is advantageous for several reasons. First, it allows the apparatus 10 to be used to decode signals sent from several different MWD tools 40 simply by selecting a different one of the decoder implementations 20 in software. No hardware needs to be physically changed or swapped in order to decode signals sent from different MWD tools 40, which facilitates ease of use. Second, as the upstream interfaces 22 of all of the decoder implementations 20 are each conformed to the API used by the downstream interface 16 of the signal processing unit 14, the signal processing unit 14 can treat each of the decoding units 18 as a black box. This results in a modular design which allows changes to be made to any one of the decoding units 18 without affecting other modules within the apparatus 10.

In the present embodiment, the decoder configuration manager 26, translation layer 24, the signal processing unit 14 and the decoder implementation 20 are implemented as modules in the Java programming language, but in alternative embodiments any or all may be implemented according to any suitable programming language, such as C# and C++.

In the present embodiment, the decoder configuration manager 26, translation layer 24, signal processing unit 14 and the decoder implementation 20 are all executed using a single processor (not shown) that forms part of the apparatus 10. The apparatus 10 also includes a computer readable medium (not shown) that is communicatively coupled to the processor and that stores information useful for implementation of the decoder configuration manager 26, translation layer 24, signal processing unit 14 and decoder implementation 20, such as software code. However, in alternative embodiments, any one or more of the decoder configuration manager 26, translation layer 24, signal processing unit 14 and decoder implementation 20 may be implemented using a standalone processor and computer readable medium physically removed from, yet still in communication with, the other modules of the apparatus 10 as depicted in FIG. 2. Furthermore, although the apparatus 10 of the present embodiment relies on a processor, other devices as known to skilled persons such as microcontrollers, programmable logic devices, and general purpose computers can be used to implement the modules of the apparatus 10. A suitable computer readable medium includes any medium that is known to be suitable to skilled persons, such as suitable forms of disc-based and semiconductor-based media including RAM, ROM, flash memory, hard disk drives, CD-ROMs, and DVDs.

For the sake of convenience, the embodiments above are described as various interconnected functional blocks or distinct software modules. This is not necessary, however, and there may be cases where these functional blocks or modules are equivalently aggregated into a single logic device, program or operation with unclear boundaries. For example, the translation layer 24 and the decoder implementation 20 can be implemented separately such that they are able to be instantiated at different times in independent modules implemented on the same or different pieces of hardware, and such that they do not form a single decoding unit 18. In any event, the functional blocks and software modules or features of the flexible interface can be implemented by themselves, or in combination with other operations in either hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for decoding a signal sent from a measurement-while-drilling tool, the method comprising:
   (a) receiving the signal in a module of an apparatus for decoding the signal sent from the measurement-while-drilling tool;
   (b) instantiating, from one of multiple available decoder implementations, a decoder implementation configured to decode the received signal into a decoded signal and communicative according to a decoder implementation protocol;
   (c) using a translation layer, translating a transmission protocol used by the module to send the received signal to the decoder implementation into the decoder implementation protocol, such that the decoder implementation can process the received signal, wherein the decoder implementation is unable to process the received signal prior to the transmission protocol being translated, and wherein the transmission protocol and decoder implementation protocol are different communication protocols;
   (d) sending the received signal according to the transmission protocol from the module to the instantiated decoder implementation; and
   (e) decoding the signal into the decoded signal using the instantiated decoder implementation.

2. A method as claimed in claim 1 further comprising, following decoding, sending the decoded signal to a signal processing unit, communicative according to a signal processing unit protocol, for processing.

3. A method as claimed in claim 2 wherein the module is the signal processing unit, the transmission protocol is the signal processing unit protocol, the signal processing unit sends the received signal to the decoder implementation for decoding, and transmissions from the signal processing unit to the decoder implementation and from the decoder implementation to the signal processing unit use the translation layer.

4. A method as claimed in claim 1 wherein sending the received signal according to the transmission protocol comprises sending the received signal on a per sample basis.

5. A method as claimed in claim 4 wherein sending the received signal according to the transmission protocol further comprises sending a sampling rate at which the received signal was sampled to the decoder implementation to facilitate decoding.

6. A method as claimed in claim 2 wherein the decoded signal comprises parameters measured by the measurement-while-drilling tool and wherein sending the decoded signal to the signal processing unit comprises asynchronously sending the parameters from the decoder implementation to the signal processing unit.

7. A method as claimed in claim 6 further comprising instantiating a listener module configured to send one type of the parameters.

8. A method as claimed in claim 7 wherein the parameters are selected from a group consisting of a type of measurement-while-drilling word, a value of the measurement-while-drilling word, checksum of the measurement-while-drilling word, quality of the measurement-while-drilling word, time at which the measurement-while-drilling word was decoded, type of error encountered when decoding the measurement-while-drilling word, percentage of expected measurement-while-drilling words that have been successfully decoded, quality rating of the signal, status of the decoder implementation, height of pressure pulses detected by the decoder implementation, current mode in which the measurement-while-drilling tool is configured to operate, mud pump state, whether a change in measurement-while-drilling tool mode has occurred, and a new mode in which the measurement-while-drilling tool is to operate.

9. A method as claimed in claim 2 wherein the decoded signal comprises parameters measured by the measurement-while-drilling tool and further comprising sending a synchronous request from the signal processing unit to the decoder implementation requesting at least one of the parameters, and wherein sending the decoded signal to the signal processing unit comprises synchronously responding to the synchronous request.

10. A method as claimed in claim 9 wherein the parameters are selected from a group consisting of current status of the decoder implementation, current pulse height, current mud pump state, current quality rating of the signal, percentage of expected words from the measurement-whiledrilling tool that have been successfully decoded, and current mode in which the measurement-while-drilling tool is configured to operate.

11. A method as claimed in claim 1 further comprising sending to the decoder implementation information regarding a tool mode in which the measurement-while-drilling tool was operating when sampling the received signal.

12. A method as claimed in claim 2 wherein the decoded signal comprises data that the signal processing unit can use to display mud pulses sent by the measurement-while-drilling tool.

13. A method as claimed in claim 1 wherein the multiple available decoder implementations comprise first and second decoder implementations and instantiating the decoder implementation comprises:
 (a) accessing a decoder definition list file containing a listing of decoder definition files corresponding to the first and second decoder implementations, the first and second decoder implementations configured to decode differently encoded signals; and
 (b) instantiating the decoder implementation corresponding to the encoding of the signal using the decoder definition file corresponding to the decoder implementation configured to decode the signal.

14. A method as claimed in claim 13 further comprising:
 (a) receiving input from a user indicating which of the decoder implementations has been selected for use in decoding the received signal; and
 (b) using the selected decoder implementation to decode the received signal.

15. The method as claimed in claim 6 further comprising instantiating multiple listener modules such that multiple instances of the listener modules exist, wherein each of the listener modules is configured to send a type of the parameters different than the types of the parameters that the other one or more listener modules send.

16. The method as claimed in claim 15 wherein each of the listener modules is configured to facilitate communication with a destination different than destinations with which the other one or more listener modules are configured to facilitate communication.

17. An apparatus for decoding a signal sent from a measurement-while-drilling tool, the apparatus comprising:
 (a) a module for receiving the signal;
 (b) a processor; and
 (c) a computer readable medium communicatively coupled to the processor and having encoded thereon statements and instructions to cause the processor to perform a method comprising:
  (i) instantiating, from one of multiple available decoder implementations, a decoder implementation configured to decode the received signal into a decoded signal and communicative according to a decoder implementation protocol;
  (ii) using a translation layer, translating a transmission protocol used by the module to send the received signal to the decoder implementation into the decoder implementation protocol, such that the decoder implementation can process the received signal, wherein the decoder implementation is unable to process the received signal prior to the transmission protocol being translated, and wherein the transmission protocol and decoder implementation protocols are different communication protocols;
  (iii) sending the received signal according to the transmission protocol from the module to the instantiated decoder implementation; and
  (iv) decoding the signal into the decoded signal using the instantiated decoder implementation.

18. An apparatus as claimed in claim 17 wherein the method further comprises, following decoding, sending the decoded signal to a signal processing unit, communicative according to a signal processing unit protocol, for processing.

19. An apparatus as claimed in claim 18 wherein the module is the signal processing unit, the transmission protocol is the signal processing unit protocol, the signal processing unit sends the signal to the decoder implementation for decoding, and transmissions from the signal processing unit to the decoder implementation and from the decoder implementation to the signal processing unit use the translation layer.

20. An apparatus as claimed in claim 17 wherein sending the received signal according to the transmission protocol comprises sending the received signal on a per sample basis.

21. An apparatus as claimed in claim 20 wherein sending the received signal according to the transmission protocol further comprises sending a sampling rate at which the received signal was sampled to the decoder implementation to facilitate decoding.

22. An apparatus as claimed in claim 18 wherein the decoded signal comprises parameters measured by the measurement-while-drilling tool and wherein sending the decoded signal to the signal processing unit comprises asynchronously sending the parameters from the decoder implementation to the signal processing unit.

23. An apparatus as claimed in claim 22 wherein the method further comprises instantiating a listener module configured to send one type of the parameters.

24. An apparatus as claimed in claim 23 wherein the parameters are selected from a group consisting of a type of measurement-while-drilling word, a value of the measurement-while-drilling word, checksum of the measurement-while-drilling word, quality of the measurement-while-drilling word, time at which the measurement-while-drilling word was decoded, type of error encountered when decoding the measurement-while-drilling word, percentage of expected measurement-while-drilling words that have been successfully decoded, quality rating of the signal, status of the decoder implementation, height of pressure pulses detected by the decoder implementation, current mode in which the measurement-while-drilling tool is configured to operate, mud pump state, whether a change in measurement-while-drilling tool mode has occurred, and a new mode in which the measurement-while-drilling tool is to operate.

25. An apparatus as claimed in claim 18 wherein the decoded signal comprises parameters measured by the measurement-while-drilling tool and wherein the method further comprises sending a synchronous request from the signal processing unit to the decoder implementation requesting at least one of the parameters, and wherein sending the decoded signal to the signal processing unit comprises synchronously responding to the synchronous request.

26. An apparatus as claimed in claim 25 wherein the parameters are selected from a group consisting of current status of the decoder implementation, current pulse height, current mud pump state, current quality rating of the signal, percentage of expected words from the measurement-while-drilling tool that have been successfully decoded, and current mode in which the measurement-while-drilling tool is configured to operate.

27. An apparatus as claimed in claim 17 wherein the method further comprises sending to the decoder implementation information regarding a tool mode in which the measurement-while-drilling tool was operating when sampling the received signal.

28. An apparatus as claimed in claim 18 wherein the decoded signal comprises data that the signal processing unit can use to display mud pulses sent by the measurement-while-drilling tool.

29. An apparatus as claimed in claim 17 wherein the multiple available decoder implementations comprise first and second decoder implementations and instantiating the decoder implementation comprises:
 (a) accessing a decoder definition list file containing a listing of decoder definition files corresponding to the first and second decoder implementations, the first and second decoder implementations configured to decode differently encoded signals; and
 (b) instantiating the decoder implementation corresponding to the encoding of the signal using the decoder definition file corresponding to the decoder implementation configured to decode the signal.

30. An apparatus as claimed in claim 29 wherein the method further comprises:
 (a) receiving input from a user indicating which of the decoder implementations has been selected for use in decoding the received signal; and
 (b) using the selected decoder implementation to decode the received signal.

31. The apparatus as claimed in claim 22 wherein the method further comprises instantiating multiple listener modules such that multiple instances of the listener modules exist, wherein each of the listener modules is configured to send a type of the parameters different than the types of the parameters that the other one or more listener modules send.

32. The apparatus as claimed in claim 31 wherein each of the listener modules is configured to facilitate communication with a destination different than destinations with which the other one or more listener modules are configured to facilitate communication.

33. A non-transitory computer readable medium having encoded thereon statements and instructions to cause a processor to execute a method for decoding a signal sent from a measurement-while-drilling tool, the method comprising:
 (a) receiving the signal in a module;
 (b) instantiating, from one of multiple available decoder implementations, a decoder implementation configured to decode the received signal into a decoded signal and communicative according to a decoder implementation protocol;
 (c) using a translation layer, translating a transmission protocol used by the module to send the received signal to the decoder implementation into the decoder implementation protocol, such that the decoder implementation can process the received signal, wherein the decoder implementation is unable to process the received signal prior to the transmission protocol being translated, and wherein the transmission protocol and decoder implementation protocol are different communication protocols;
 (d) sending the signal according to the transmission protocol from the module to the instantiated decoder implementation; and
 (e) decoding the signal into the decoded signal using the instantiated decoder implementation.

34. An apparatus for decoding a signal sent from a measurement-while-drilling tool, the apparatus comprising:
 (a) a signal processing unit communicatively coupled to the measurement-while-drilling tool configured to receive the signal, and comprising a downstream interface configured to communicate according to a signal processing unit protocol, the downstream interface for sending the received signal to a decoding unit for decoding and for receiving a decoded signal; and
 (b) the decoding unit, comprising:
  (i) a decoder implementation, instantiated from one of multiple available decoder implementations, configured to decode the received signal into the decoded signal and comprising an upstream interface configured to communicate according to a decoder implementation protocol that differs from the signal processing unit protocol, the upstream interface for receiving the received signal for decoding and for sending the decoded signal, and wherein the transmission protocol and decoder implementation protocol are different communication protocols; and
  (ii) a translation layer communicatively coupled between the downstream interface of the signal processing unit and the upstream interface of the decoding unit and configured to translate the signal processing unit protocol to the decoder implementation protocol such that the signal processing unit and the decoding unit are communicatively coupled.

35. The apparatus as claimed in claim 34 wherein the signal processing unit protocol is an application programming interface (API).

* * * * *